United States Patent
Staudinger et al.

(10) Patent No.: US 8,500,602 B2
(45) Date of Patent: Aug. 6, 2013

(54) METHOD FOR OPERATION OF A TRANSMISSION

(75) Inventors: Joachim Staudinger, Ravensburg (DE); Peter Herter, Ravensburg (DE); Wolfgang Groener, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 248 days.

(21) Appl. No.: 13/143,743

(22) PCT Filed: Jan. 8, 2010

(86) PCT No.: PCT/EP2010/050147
§ 371 (c)(1), (2), (4) Date: Jul. 8, 2011

(87) PCT Pub. No.: WO2010/089163
PCT Pub. Date: Aug. 12, 2010

(65) Prior Publication Data
US 2011/0287890 A1    Nov. 24, 2011

(30) Foreign Application Priority Data
Feb. 9, 2009   (DE) .......................... 10 2009 000 708

(51) Int. Cl.
*B60W 10/02*  (2006.01)
*B60W 10/04*  (2006.01)
*B60W 10/00*  (2006.01)

(52) U.S. Cl.
USPC ............. 477/175; 477/107; 477/77; 475/208

(58) Field of Classification Search
USPC ................ 477/107, 112, 113, 174, 175, 180, 477/181, 77; 475/208, 218; 74/15.66, 336 R
See application file for complete search history.

(56) References Cited

U.S. PATENT DOCUMENTS

| | | | |
|---|---|---|---|
| 6,080,081 A | 6/2000 | Sauermann et al. | |
| 6,517,465 B2 * | 2/2003 | Hrazdera | 477/174 |
| 6,889,804 B2 | 5/2005 | Inoue et al. | |
| 7,347,804 B2 | 3/2008 | Steen et al. | |
| 7,953,535 B2 * | 5/2011 | Landes et al. | 701/56 |
| 8,417,426 B2 * | 4/2013 | Vermeulen | 701/50 |
| 2004/0229727 A1 * | 11/2004 | Kim | 477/175 |

FOREIGN PATENT DOCUMENTS

| | | |
|---|---|---|
| DE | 197 08 929 A1 | 9/1998 |
| DE | 60 2005 000 481 T2 | 5/2007 |
| DE | 10 2007 010 829 A1 | 9/2008 |
| EP | 1 270 979 A2 | 1/2003 |
| WO | 2004/035344 A1 | 4/2004 |
| WO | 2008/107318 A1 | 9/2008 |

* cited by examiner

Primary Examiner — Roger Pang
(74) Attorney, Agent, or Firm — Davis & Bujold, PLLC

(57) ABSTRACT

A method of operating a transmission positioned between a drive aggregate and an axle drive, a transmission input shaft is connected, via a clutch, with the drive aggregate, and a transmission output shaft is connected with the axle drive and power can be diverted from the transmission to drive a power take-off. The PTO is activated by an engine intervention, shifting the transmission to neutral and disengaging the clutch. Thereafter, the clutch is partially engaged at either a position dependent or distance dependent clutch speed while monitoring the input rotational speed and drive aggregate rotational speed. When the input rotational speed approximately equals the drive aggregate rotational speed and the idle rotation speed of the drive aggregate, the clutch is no longer being engaged at the position dependent or distance dependent clutch speed, but is fully engaged at a maximum clutch speed.

7 Claims, 3 Drawing Sheets

METHOD FOR OPERATION OF A TRANSMISSION

This application is a National Stage completion of PCT/EP2010/050147 filed Jan. 8, 2010, which claims priority from German patent application serial no. 10 2009 000 708.3 filed Feb. 9, 2009.

FIELD OF THE INVENTION

The invention relates to a method for operating a transmission of a motor vehicle.

BACKGROUND OF THE INVENTION

Multi-range transmissions comprising a multi-step main transmission, a following range group, and either an upstream or downstream splitter group, have been known for a while and are mainly used in utility vehicles. For instance, with a two-step designed splitter group within the half of a central gear ratio step, between two consecutive gear ratio steps of the main transmission and the respective gear ratio step, the gear ratio steps of the main transmission are cut in half and the amount of the total available gears of the group transmission is doubled. For instance, through a two-step range group, with transmission ratio step approximately centered between two consecutive transmission ratio steps of the main transmission over the total gear ratio steps of the main transmission and its gear ratio step, the spread of the group transmission is nearly double and the amount of the total, available gears is again doubled.

FIG. 1 shows a scheme of a group transmission of the so-called AS-Tronic family, provided by the applicant. The group transmission presented in FIG. 1 comprises a main transmission HG, a front-mounted front group, or splitter group GV, as well as range group GP positioned downstream from the main transmission HG. The main transmission HG of the group transmission CT in FIG. 1 is a direct gear transmission of a counter shaft transmission design and has a main shaft $W_H$ and two counter shafts $W_{VG1}$ and $W_{VG2}$, wherein the first counter shaft $W_{VG1}$ is connectable to a controllable transmission brake Br.

The main transmission HG has a three-step design with three gear ratio steps G1, G2, and G3 for forward drive, and with a gear ratio step R for reverse drive. Idler gears for the gear ratio steps G1, G2, G3, and R are each rotatably positioned on the main shaft $W_H$ and can be shifted via assigned claw clutches. The assigned fixed gears are rotationally fixed on the countershafts $W_{VG1}$ and $W_{VG2}$.

The highest gear ratio step G3 of the main transmission HG, which is designed as a direct gear, can be shifted via a direct shift clutch. The shift clutches of the gear ratios G3 and G2, as well as the shift clutches of the gear ratios G1 and R are each combined in a common shift packet S1 or S2, respectively. The main transmission HG can be non-synchronized shifted.

The front group, or splitter group GV of the group transmission CT in FIG. 1 is designed with two-steps, and is also constructed in a countershaft design, wherein the two gear ratio steps K1 and K2 of the front group GV represent two shiftable input constants of the main transmission HG. Due to a small gear ratio difference of the two gear ratio steps K1, K2, the front group GV is designed as a splitter group. The idler gear of the first gear step K1 of the transmission is rotatably positioned on the input shaft $W_{GE}$ which is connected, via a controllable separation clutch K, with a drive aggregate, not shown, which is designed as a combustion engine.

The idle gear of the second gear ratio step K2 is rotatably supported on the main shaft $W_H$. The fixed gears of both gear ratio steps K1, K2 of the front group GV are each rotationally fixed on the counter shafts $W_{VG1}$ and $W_{VG2}$ on the input side of the main transmission. The synchronous designed shift groups of the front group GV are combined in a common shift package SV.

The range group GP of the group transmission CT in FIG. 1, which is behind the main transmission HG, is also of a two-step design, but is of a planetary construction having a simple planetary gear set. The sun gear PS is rotationally fixed to the main shaft $W_H$ at the output side of the main transmission HG. The planetary carrier PT is rotationally fixed to the output shaft $W_{GA}$ of the group transmission CT. The ring gear PH is connected with a shift package SP which has two synchronous shift clutches through which the range group GP can be shifted alternatively, via a connection between the ring gear PH and the housing, into a low speed drive step L and, via a connection between the ring gear PH and the main shaft $W_H$ or the sun gear PS, into a high-speed drive step S. The range group GP is synchronously shifted.

Power can be branched off the countershaft $W_{VG2}$ of the group transmission CT to drive a power take-off PTO. When power is needed from the group transmission CT to drive the power take-off PTO, it happens during the activation or connection of the power take-off PTO in a way that first an idle rotation speed of the drive aggregate is requested through an engine intervention and thereafter, the transmission is shifted to neutral and the separation clutch K is disengaged and thereafter, the separation clutch K is again engaged and then, when the separation clutch K is again completely engaged, the engine intervention is terminated.

The engagement of the separation clutch K happens in the state of the art as shown in FIG. 2, in which the diagram in FIG. 2 shows a clutch position of the separation clutch K in percent over the time t. At the time $t_1$, the separation clutch K starts engaging when the power take-off PTO is being activated or connected whereupon at the time $t_2$ the separation clutch K is again completely engaged.

In accordance with the state of the art, engagement of the separation clutch K takes place between the time $t_1$ and $t_2$, by means of the characteristic which is dependent on the clutch position, thus, the separation clutch K is completely engaged, in the state of the art, between the time $t_1$ and $t_2$, at a position dependent or distance dependent, respectively, clutch speed.

Due to the fact that the load torque to be assumed by the power take-off PTO is not known, the characteristic curve, through which the separation clutch K is to activate or connect, the power take-off PTO depending on the position or distance needs to be dimensioned so as to prevent the drive aggregate from stalling when the separation clutch K is engaged. Therefore, the separation clutch K is slowly engaged, but this is a disadvantage when lower loads are assumed by the power take-off PTO, because the separation clutch K can here actually be engaged faster. This represents a disadvantage.

An analogous problem arises also when load is diverted from other transmission types to drive an auxiliary drive. Although the invention is presented in conjunction with a group transmission, the application of it is not limited to group transmissions, but can also be used with any transmissions where power can be diverted to drive an auxiliary drive.

Known from DE 197 08 929 A1 is a method to operate a transmission which can be used to drive an auxiliary drive via a countershaft of the group transmission, where a separation clutch can first be disengaged and is thereafter again engaged.

SUMMARY OF THE INVENTION

Based on this, the objective of the invention is to create a novel method for the operation of a transmission of a motor vehicle.

In accordance with the invention, the separation clutch is disengaged in such a way that the separation clutch is first partially engaged at a position dependent or distance dependent clutch speed, and during the partial engagement of the separation clutch at a position dependent or distance dependent clutch speed, a transmission input rotational speed and an aggregate rotational speed are monitored, and then, when the transmission input rotational speed has reached approximately the drive aggregate rotational speed and the drive aggregate rotational speed matches approximately the idle rotational speed of the drive aggregate, the separation clutch is no longer engaged at the position dependent or distance dependent clutch speed, but is completely engaged at maximum clutch speed.

It is proposed in the present invention, to engage the separation clutch during the activating or connecting of the auxiliary output in such a way that the separation clutch is first partially engaged at a position dependent or distance dependent clutch speed. During such partial engagement of the separation clutch, a transmission input rotational speed and a drive aggregate rotational speed are simultaneously monitored. At the time, when the rotational speed of the transmission input shaft reaches approximately the rotational speed of the drive aggregate, and when further the rotational speed of the drive aggregate matches approximately the idle rotational speed, the separation clutch K is no longer engaged at the position dependent or distance dependent clutch speed, but at the maximum clutch speed or engagement speed.

The engagement function of the separation clutch will adopt itself automatically to the load torque which is needed for the auxiliary output, so that the separation clutch is always engaged in the minimum amount of engagement time and thus, in an optimal engagement time.

BRIEF DESCRIPTION OF THE DRAWINGS

Preferred additional embodiments of the invention are part of the dependent claims and the following description. One embodiment of the invention, without being limited thereto, is further explained with the drawings. These show:

DETAILED DESCRIPTION OF THE PREFERRED EMBODIMENTS

Figure 1:
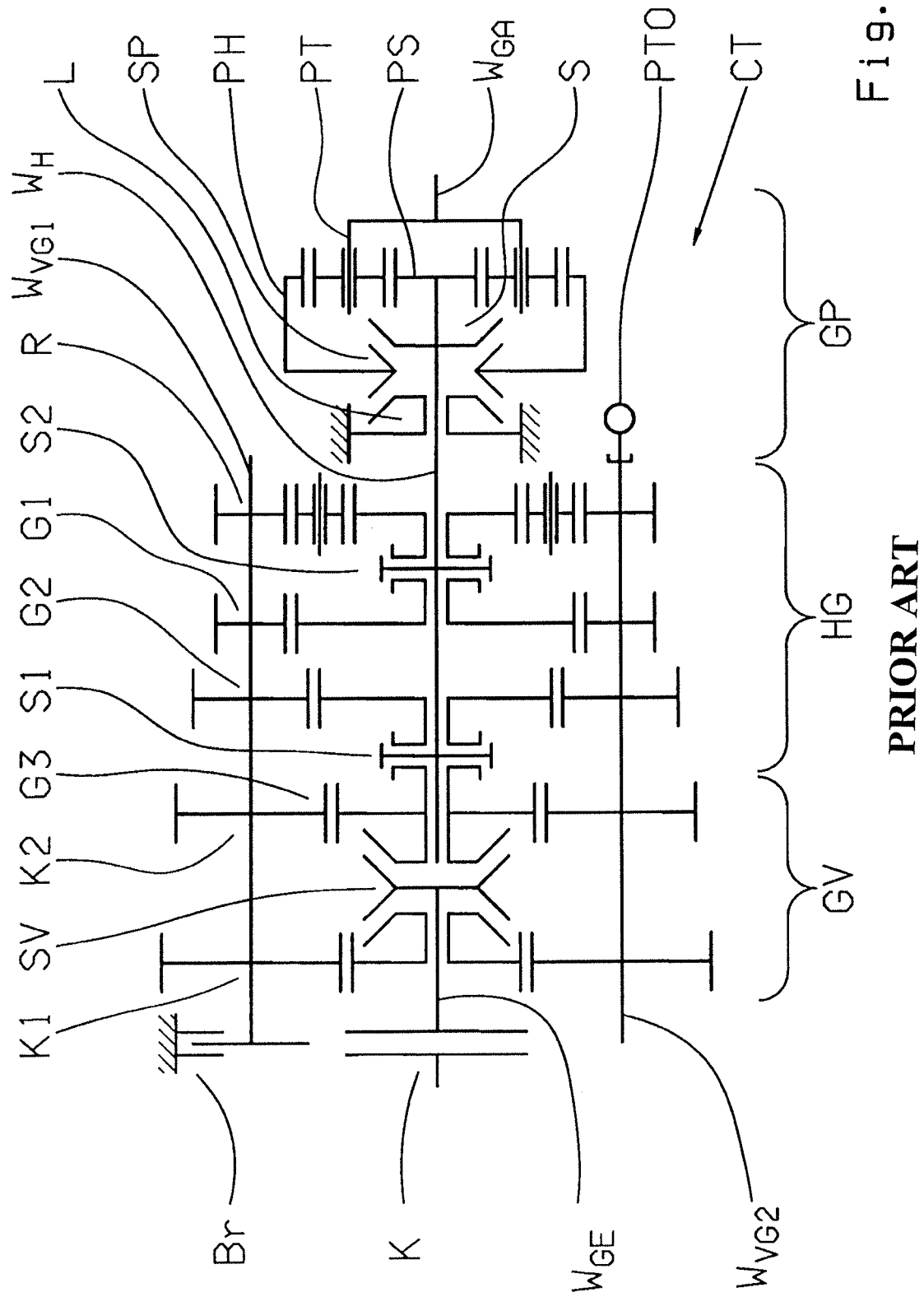
FIG. 1 a schematic transmission which is known from the state of the art and which is designed as a group transmission of a motor vehicle.
Figure 2:
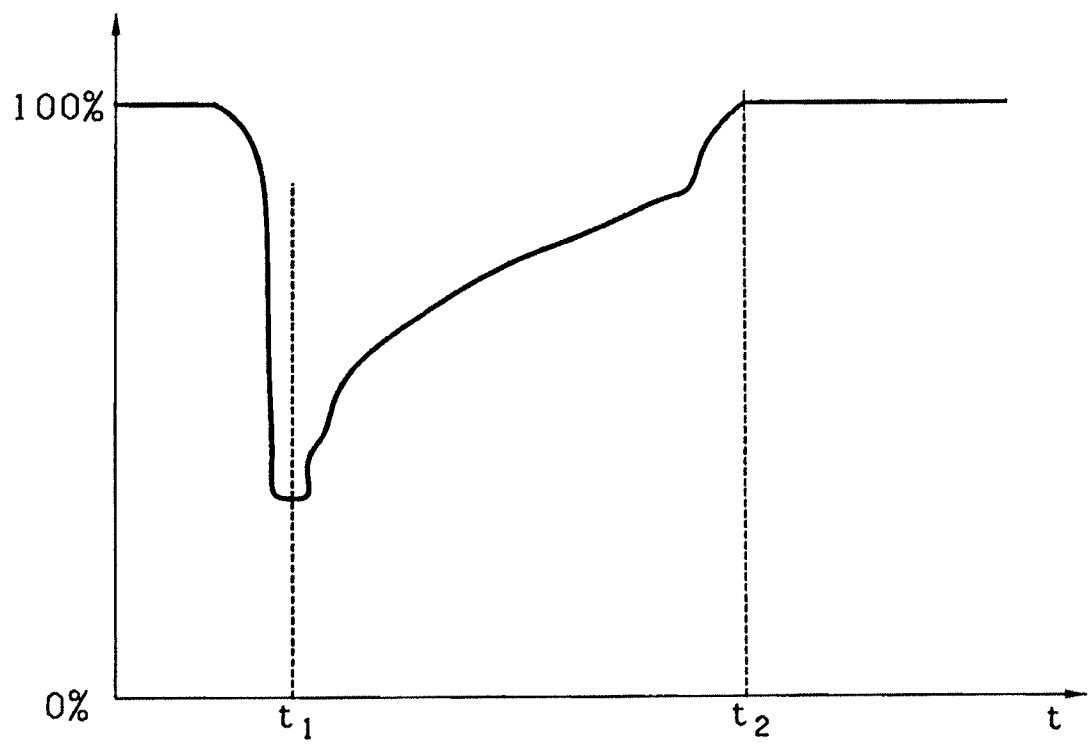
FIG. 2 a diagram for the clarification of the known method as in the state of the art for the operation of a transmission of a motor vehicle.

The present invention relates to a method for the operation of a transmission of a motor vehicle, in particular an automated group transmission CT as shown in FIG. 1 and already described in detail.

The invention is not limited to group transmissions but can also be used with other transmissions.

The present invention relates to such details which are associated with the engagement of the separation clutch K during the activation or connection of the auxiliary output.

In terms of this present invention, during the activation or connection of the power take-off PTO, the separation clutch K is engaged in such a way, that the separation clutch K is initially engaged at a position dependent or distance dependent clutch speed. During this partial engagement of the separation clutch K at the position dependent or distance dependent clutch speed, a transmission input rotational speed or a rotational speed of the transmission input shaft $W_{GE}$ and an aggregate rotational speed or a rotational speed of a not shown drive aggregate are monitored.

At the time, when the transmission input rotational speed has reached approximately the drive aggregate rotational speed and further on, the drive aggregate rotational speed almost matches the idle rotational speed of the drive aggregate, the separation clutch K is no longer engaged at the position dependent or distance dependent clutch speed but instead at a maximum clutch speed and thus engagement speed, meaning hereby up to the complete engagement of the separation clutch K.

The transmission input rotational speed has reached approximately the drive aggregate rotational speed at the time when the deviation between the transmission input rotational speed and the drive aggregate rotational speed is lower than a first threshold value. The drive aggregate rotational speed corresponds approximately to the idle rotational speed of the drive aggregate at the time when the deviation between the drive aggregate rotational speed and the idle rotational speed of the drive aggregate is lower than a second threshold value. These two threshold values can be freely parameterized.

To engage the separation clutch K at the maximum engagement speed, the engagement valves of the separation clutch K are continuously energized, thus, they are vented through a steady pulse until the separation clutch K is completely engaged.

Figure 3:
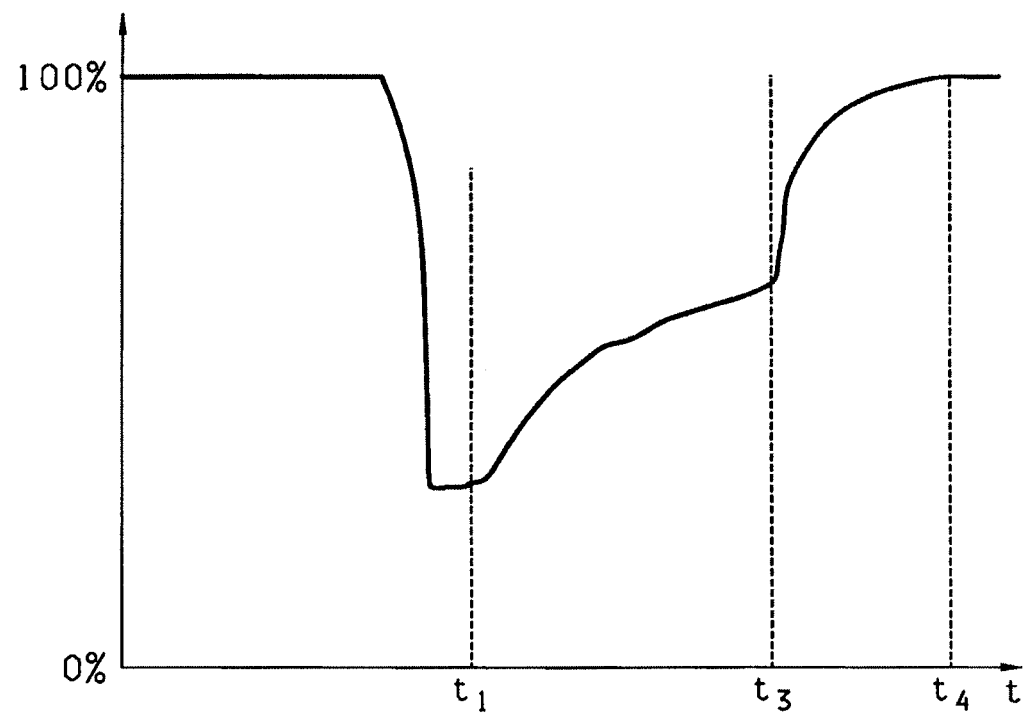
FIG. 3 a diagram for the clarification of the inventive method for the operation of a transmission of a motor vehicle.

FIG. 3 clarifies the inventive method based on a diagram in which the engagement position of the separation clutch K is shown as a percent over the time t. At the time t1, the engagement of the separation clutch K begins with the activating or connecting of the power take-off PTO. Between time $t_1$ and $t_3$, the separation clutch K is engaging at a position dependent or distance dependent clutch speed.

At the time t3, the transmission input rotational speed has reached approximately the drive aggregate rotational speed and the drive aggregate rotational speed almost matches the idle rotational speed of the drive aggregate. Starting at the time $t_3$, the separation clutch K is no longer engaged at the position dependent or distance dependent clutch speed, but rather at the maximum clutch speed until the time $t_4$ at which the separation clutch K is fully engaged.

In accordance with an advantageous, additional embodiment of this present invention at the time $t_3$, meaning when the transmission input rotational speed has reached approximately the drive aggregate rotational speed and when the drive aggregate rotational speed matches approximately the idle rotational speed of the drive aggregate, the engine intervention is simultaneously canceled. This is an additional difference to the state of the art in which the engine intervention can only be canceled when the separation clutch K is completely engaged.

The inventive method enables faster engagement of the separation clutch K, independent of the load torque which is needed for the power take-off PTO. The engagement function for the separation clutch K adopts itself automatically to the load torque which is needed for the power take-off PTO. The separation clutch can always be engaged in a minimum amount of clutch engagement time. Due to the early cancellation of the engine intervention, the driver has earlier control of the throttle.

The invention claimed is:

1. A method of operating a transmission of a motor vehicle, wherein the transmission is positioned in a drive train between a drive aggregate and an axle drive, an input shaft of the transmission is connected via a controllable separation clutch (K) with the drive aggregate, and an output shaft of the transmission is connected with the axle drive, and power is divertable from the transmission to drive a power take-off (PTO), and for either activating or connecting the power take-off (PTO), a rotation speed of the drive aggregate is first requested via an engine intervention, the transmission is shifted to neutral and the separation clutch (K) is disengaged and thereafter, the separation clutch (K) is again engaged and the engine intervention is canceled, the method comprising the steps of:

partially engaging the separation clutch (K) at either a position dependent or a distance dependent clutch speed;

monitoring a transmission input rotational speed and a drive aggregate rotational speed during the partial engagement of the separation clutch (K) at the either position dependent or the distance dependent clutch speed; and discontinuing engagement of the separation clutch (K), at the either position dependent or the distance dependent clutch speed, and fully engaging the separation clutch (K) at a maximum clutch speed, when the transmission input rotational speed approximately reaches the drive aggregate rotational speed, and the drive aggregate rotational speed approximately matches an idle rotational speed of the drive aggregate.

2. The method according to claim 1, further comprising the step of continuously energizing engagement valves of the separation clutch (K) for the complete engagement of the separation clutch (K) at the maximum clutch speed.

3. The method according to claim 1, further comprising the step of canceling the engine intervention simultaneously when the transmission input rotational speed approximately reaches the drive aggregate rotational speed and the drive aggregate rotational speed approximately matches the idle rotational speed of the drive aggregate.

4. The method according to claim 1, further comprising the step of defining, when the transmission input rotational speed approximately reaches the drive aggregate rotational speed, as being when a deviation between the transmission input rotational speed and the drive aggregate rotational speed is lower than a first threshold value.

5. The method according to claim 1, further comprising the step of defining, when the drive aggregate rotational speed approximately matches the idle rotational speed of the drive aggregate, as being when a deviation between the drive aggregate rotational speed and the idle rotational speed is lower than a second threshold value.

6. The method according to claim 1, further comprising the step of defining the transmission as a group transmission which comprises at least of a multi-step main transmission (HG) and at least one of an upstream and a downstream splitter group (SV), the main transmission (HG) has a countershaft construction with at least one lay shaft ($W_{VG1}$, $W_{VG2}$) the input shaft ($W_{GE}$) of the group transmission is connected via the controllable separation clutch (K) with the drive aggregate, and the output shaft ($W_{GA}$) of the group transmission is connected with the axle drive such that power is divertable from the group transmission at the lay shaft ($W_{GV2}$) to drive the auxiliary drive (PTO).

7. A method of operating a transmission of a motor vehicle comprising a drive train in which the transmission being positioned between a drive aggregate and an axle drive, an input shaft of the transmission being connected via a controllable separation clutch (K) with the drive aggregate, and an output shaft of the transmission being connected with the axle drive, and a power take-off (PTO) being engagable with the transmission to divert power therefrom, and the method for facilitating either activating or connecting the power take-off (PTO) comprising the steps of:

requesting a rotational speed of the drive aggregate through an engine intervention and disengaging the separation clutch (K) and shifting the transmission to neutral;

simultaneously partially engaging the separation clutch (K) at one of a position dependent and a distance dependent clutch speed and monitoring a transmission input rotational speed and a drive aggregate rotational speed; and discontinuing partial engagement of the separation clutch (K) at the one of the position dependent and the distance dependent clutch speed and fully engaging the separating clutch (K) at a maximum clutch speed, when the transmission input rotational speed is approximately equal to the drive aggregate rotational speed and the drive aggregate rotational speed is approximately equal to an idle rotational speed of the drive aggregate.

* * * * *